United States Patent [19]

Norcia

[11] 3,897,859
[45] Aug. 5, 1975

[54] CLUTCH FRICTION PLATE CONSTRUCTION

[76] Inventor: John A. Norcia, 2906 Sussex St. N.W., Canton, Ohio 44718

[22] Filed: Sept. 28, 1973

[21] Appl. No.: 401,666

[52] U.S. Cl. ............ 192/107 C; 64/11 F; 64/27 R; 64/27 NM; 192/106.1
[51] Int. Cl. ..... F16d 13/40; F16d 13/68; F16d 3/70
[58] Field of Search.... 192/52, 70.17, 106.1, 107 C; 64/11 F, 27 R, 27 F, 27 NM

[56] References Cited
UNITED STATES PATENTS

| | | | |
|---|---|---|---|
| 1,541,883 | 6/1925 | Wemp | 192/52 X |
| 1,818,610 | 8/1931 | Eaton | 192/106.1 |
| 2,058,575 | 10/1936 | Drude | 64/27 R X |
| 2,076,373 | 4/1937 | Katcher | 64/27 F X |
| 2,201,339 | 5/1940 | Hunt | 192/107 C |
| 2,299,010 | 10/1942 | Doman | 64/27 R |
| 2,613,785 | 10/1952 | Mohns | 64/27 F X |

FOREIGN PATENTS OR APPLICATIONS

| | | | |
|---|---|---|---|
| 547,934 | 9/1942 | United Kingdom | 192/107 C |

Primary Examiner—Allan D. Herrmann
Attorney, Agent, or Firm—Frease & Bishop

[57] ABSTRACT

A friction plate for a high performance vehicle clutch assembly having three radially outwardly extending leg members, equally spaced circumferentially about a central hub portion. The leg members having a slight degree of twist with respect to the plane of the friction plate to reduce plate chatter and vibration. Friction pads are mounted on the opposite faces of each leg member at the outermost ends thereof for engaging the flywheel and pressure plate of the driving member. A hub is mounted on the plate by a series of bolts, each of which extends through an enlarged hole in a hub flange for journaling the plate on the input shaft of the vehicle's transmission. Alternate hub mounting bolts have a resilient bushing journaled thereon to provide a cushioned hub effect between the hub and friction plate. The three leg member arrangement reduces the weight of the clutch plate thereby decreasing the time required for shifting gears during a race.

3 Claims, 9 Drawing Figures

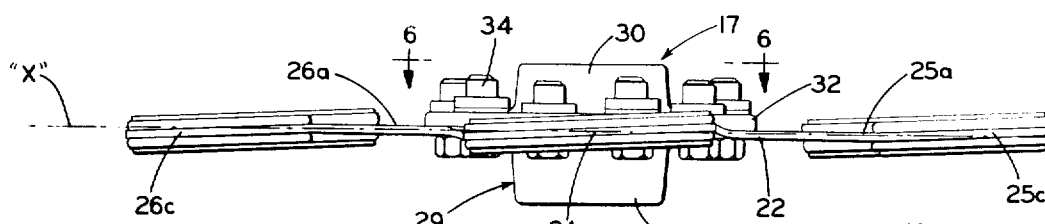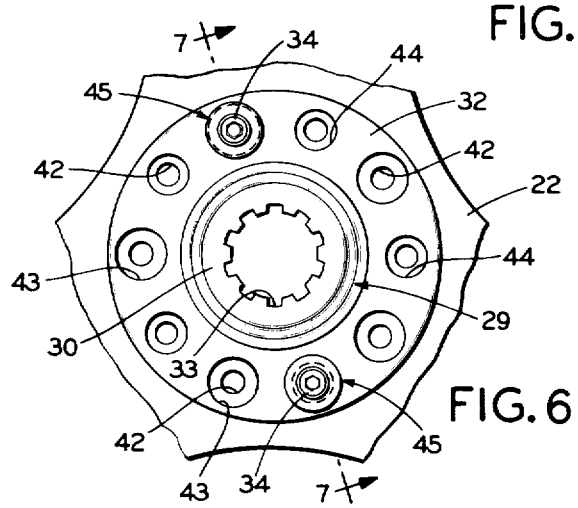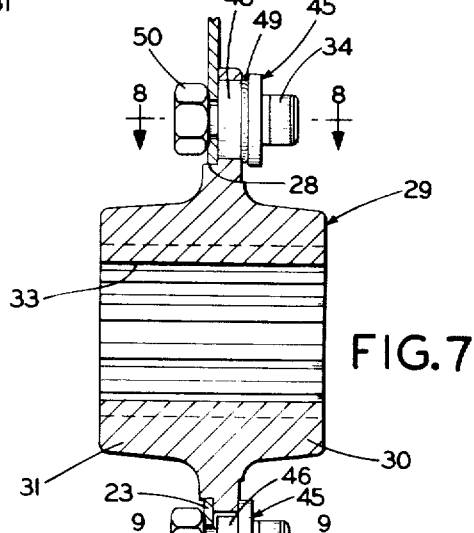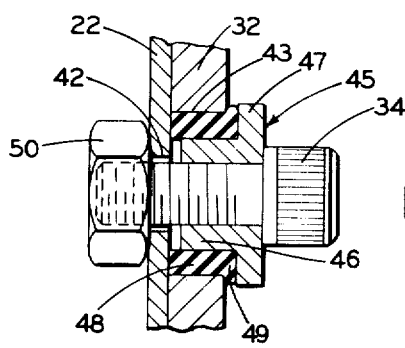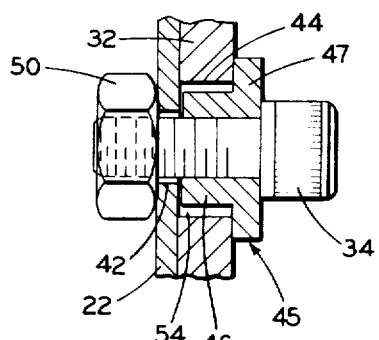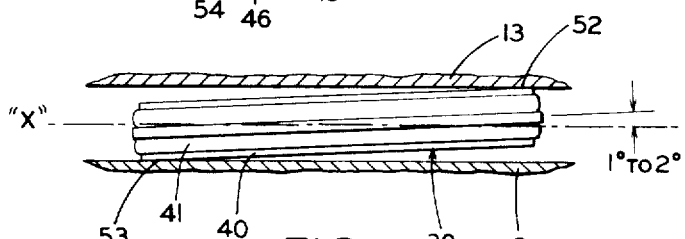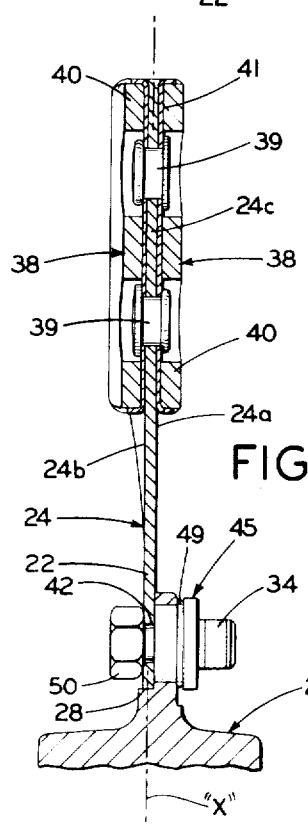

CLUTCH FRICTION PLATE CONSTRUCTION

BACKGROUND OF THE INVENTION

1. Field of the Invention

The invention relates to clutches and in particular to high performance vehicle clutch assemblies. More particularly, the invention relates to a friction plate mounted within the clutch assembly having a unique configuration which reduces the weight of the friction plate, thereby reducing the time required for the manual shifting operation to change gears, thus, increasing the racing performance of the vehicle.

2. Description of the Prior Art

There are numerous types, styles and sizes of friction clutches having countless number of various components to increase the efficiency, wear and clutch operation in both manual and automatic vehicle transmissions.

High performance vehicles such as race cars, drag racers, circle track cars, etc., require rapid gear changes in order to make the car competitive with other racers, and hopefully to achieve a slight advantage to increase the efficiency and speed of the vehicle during a race. Most high performance vehicles have either three or four-speed manual transmissions. Thus, if time can be saved during the changing or shifting of gears, even a fraction of a second, such saved time can be multiplied considerably over the racing time period to change appreciably the efficiency and results achieved by the racing vehicle.

High performance vehicles, heretofore have used existing clutch constructions similar to those of usual street automobiles and trucks with some slight modifications. Such clutch constructions usually have a circular friction disc with a ring or rings of friction material thereon, or a large number of segments spaced apart by a narrow gap, each segment of which is covered by a pad of friction material at its outer end.

These friction disc constructions, due to their circular shape, are undesirable for high performance vehicles due to their weight. When changing gears in a vehicle, the friction disc, upon depression of the clutch pedal, must be slowed down, for example from a speed of 8,000 r.p.m. to 6,500 r.p.m., for automatic synchronization with the transmission mechanism. The weight of the friction disc imparts a flywheel effect to the disc which increases the slow down time period by a fraction of a second than if a lighter weight friction disc were used. Such fractions of seconds are not important in usual street vehicles, but are quite important in high performance racing vehicles, when such small time periods may make the difference between winning and losing a race.

Also, the elimination of clutch disc vibration and chatter encountered when two rotating plates are brought in contact is important in high performance vehicle clutch constructions as in the street vehicles. Likewise important is providing lubricating and cooling means to the friction surfaces where excess heat can affect the frictional contact and reduce the efficiency therebetween, as well as reducing the wear life of the clutch assembly components.

No clutch friction plate constructions of which I am aware have reduced the shifting speed of high performance vehicles by reducing the flywheel effect of the friction plate, by reducing the weight thereof by using a propeller-like configuration with three equally spaced outwardly extending legs, which legs have friction pads mounted on the outer ends thereof; and which legs are twisted slightly with respect to the plane of the mounting hub to reduce clutch vibration and chatter, thereby increasing the efficiency and gear shifting speed.

SUMMARY OF THE INVENTION

Objectives of the invention include providing a clutch friction plate construction for high performance vehicles which reduces the time heretofore required for shifting gears, by providing a unique friction plate configuration which reduces the weight thereof, thus reducing the flywheel effect of the friction plate without reducing the effective engagement and force transmission achieved thereby; providing a friction plate construction having three equally spaced leg members projecting radially outwardly from the disc hub, each of which has friction pads mounted on the opposite faces at the outer ends thereof; providing such a construction in which the leg members are twisted slightly with respect to the plane of the disc hub so that the edge portions of the friction pads initially contact the flywheel and pressure plate upon clutch engagement, and then twist into full engagement with the contacting members to reduce clutch vibration and chatter; providing such a construction in which the friction plate is mounted on the hub by a plurality of circumferentially spaced bolts, alternate ones of which have a resilient bushing journaled on the attachment bolt within an enlarged hub mounting hole to provide a cushioned effect between the hub and friction plate, and in which the adjacent intervening bolts having a metal bushing journaled on the mounting bolts located within a smaller hub mounting hole to prevent crushing and destruction of the cushioning bushings upon the hub rotating a predetermined distance with respect to the disc; providing such a friction plate construction having improved circulating air flow about the friction surfaces for cooling due to the unique three-leg arrangement, thereby increasing the heat transfer and cooling of the clutch assembly; and providing a clutch friction plate construction being relatively inexpensive and of a simple construction which reduces maintenance and repair problems, which achieves the stated objectives in a simple, effective and inexpensive manner, and which solves problems and satisfies needs existing in the art.

These and other objectives and advantages may be obtained by the clutch friction plate construction, the general nature of which may be stated as including a generally flat metal plate having a central area; a central opening formed in the central plate area; hub means mounted on the central plate area axially aligned with the central opening for mounting the friction plate on a vehicle transmission input shaft; three leg members formed integrally with the central plate area and extending radially outwardly therefrom and spaced equally circumferentially from each other; the leg members having a slight degree of twist with respect to the plane of the central plate area; the leg members having generally flat opposite faces with friction pad means mounted on both faces at the extended ends of the leg members; the hub means including radially extending annular flange means having a plurality of circumferentially spaced first and second holes formed therein, the second holes being larger than the first holes; rigid bushing means being inserted within the first and second holes; bolt means extending from the plate means through the first and second holes and through the bushing means; and resilient bushing means telescopically mounted on the rigid bushing means within the second flange holes to provide a cushioned hub effect when the hub means moves independent of the friction plate means.

BRIEF DESCRIPTION OF THE DRAWINGS

A preferred embodiment of the invention - illustrative of the best mode in which the applicant has contemplated applying the principles - is set forth in the following description and shown in the drawings and is particularly and distinctly pointed out and set forth in the appended claims.

FIG. 3 is an end elevation of the friction plate construction looking in the direction of arrows 3—3, FIG. 2;

FIG. 4 is an enlarged fragmentary sectional view taken on line 4—4, FIG. 2;

FIG. 5 is an enlarged end elevation of one of the friction plate leg members looking in the direction of arrows 5—5, FIG. 2;

FIG. 6 is a fragmentary top plan view of the friction plate attachment hub looking in the direction of arrows 6—6, FIG. 3;

FIG. 7 is an enlarged fragmentary sectional view taken on line 7—7, FIG. 6;

FIG. 8 is a greatly enlarged fragmentary sectional view taken on line 8—8, FIG. 7; and FIG. 9 is a greatly enlarged fragmentary sectional view taken on line 9—9, FIG. 7.

Similar numerals refer to similar parts throughout the drawings.

DESCRIPTION OF THE PREFERRED EMBODIMENT

Figure 1:
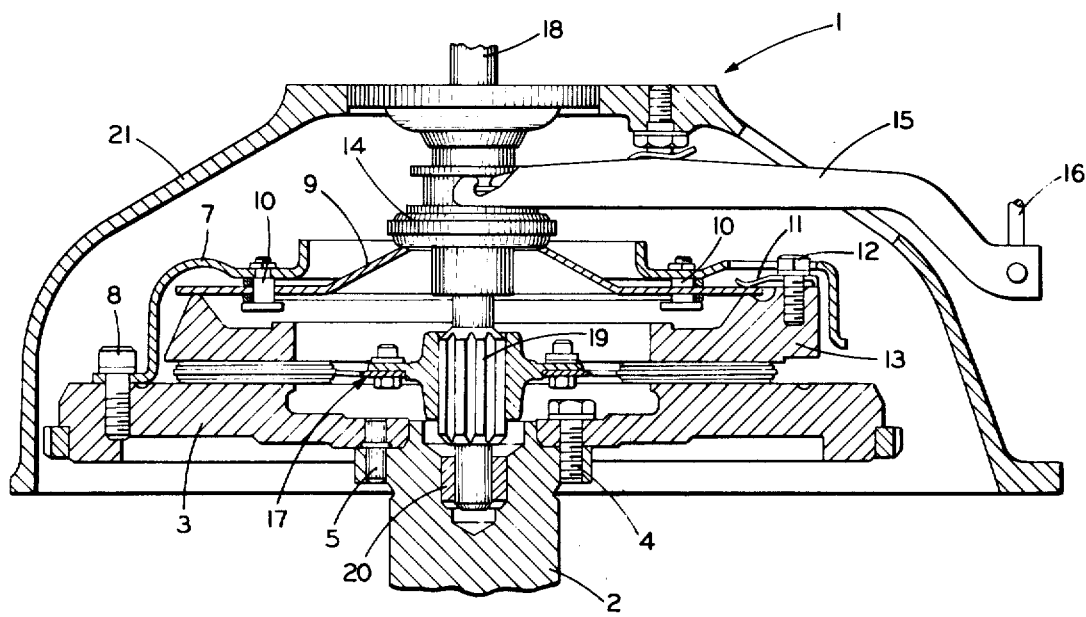
FIG. 1 is a vertical sectional view through one type of a usual clutch assembly having the improved friction plate construction incorporated therein.

One type of clutch assembly in which the improved clutch friction plate construction may be incorporated is indicated generally at 1, FIG. 1. Clutch assembly 1 includes a driving shaft 2 extending from the vehicle engine and connected to a flywheel 3 by bolts 4 and dowel pins 5. A cover 7 is mounted on flywheel 3 by bolts 8 and includes a diaphragm spring 9 mounted thereon by pins 10. A retracting spring 11 is mounted by bolt 12 on pressure plate 13. Spring 9 communicates with a throw-out bearing 14 engaged by operating lever 15, which in turn is connected to the clutch actuating pedal by rod 16.

The improved friction plate construction, indicated generally at 17, is mounted on the transmission input shaft 18 by a splined shaft portion 19. The inner end of driven shaft 18 is mounted in a pilot bushing 20 located within the end of engine shaft 2. An outer housing 21 encloses the clutch components. The above clutch assembly 1 is merely an illustration of one type of clutch in which the improved friction plate construction 17 may be incorporated.

Figure 2:
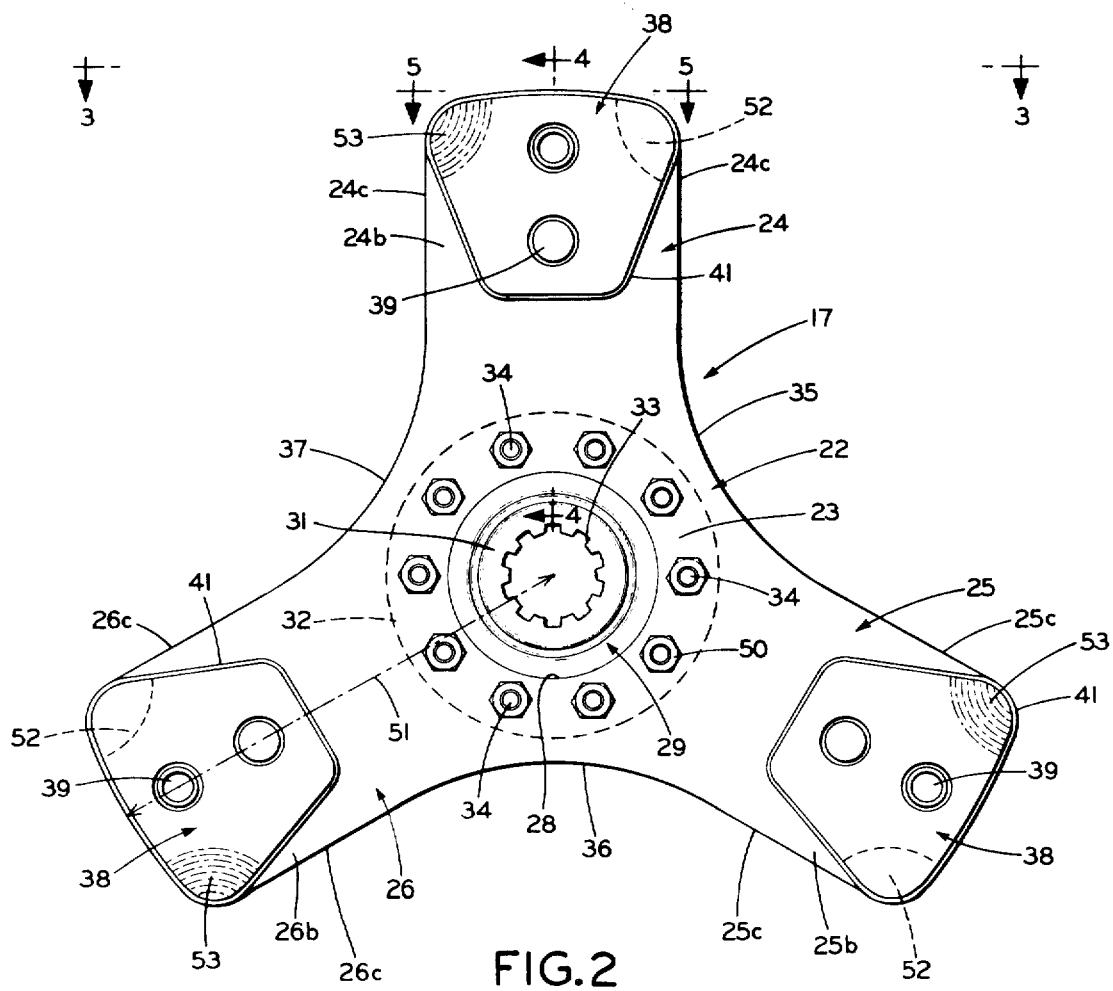
FIG. 2 is an enlarged bottom plan view of the improved friction plate construction.

In accordance with the invention, the friction plate construction 17 is a generally flat metal plate 22 having a central area 23 with three equally circumferentially spaced leg members 24, 25 and 26, formed integrally with and extending radially outwardly from central area 23. Friction plate construction 17 usually is referred to as the clutch friction disc in heretofore clutch assemblies, which function is replaced by the uniquely shaped clutch friction plate 22, as shown in FIG. 2.

Plate 22 is formed with an enlarged central opening 28 for receiving a shaft 29. Hub 29 has axially extending portions 30 and 31 extending outwardly from both surfaces of plate 22 with portion 30 having an annular flange 32 formed integrally therewith. Hub 29 has an internally splined bore 33 which engages the complementary splined shaft portion 19 of transmission shaft 18, for mounting friction plate construction 17 thereon. Hub flange 32 is mounted on central area 23 of plate 22 by a plurality of mounting bolts 34.

Central plate area 23 is approximately equal to or slightly larger than hub flange 32 in order to provide sufficient area and strength for joining integrally the inner end portions of leg members 24–26 without excess area which would increase the weight of plate 22.

Leg members 24–26 preferably have generally rectangular shapes equal in area, with flat top and bottom faces 24a–24b, 25a–25b, and 26a–26b, respectively, which terminate in end edges 24c, 25c, and 26c respectively. The end edges 24c–26c of legs 24–26 terminate and join in gradually curved edges 35, 36 and 37 as shown in FIG. 2.

Usual friction pads 38 are mounted on each of the opposite faces of leg members 24, 25 and 26 respectively, by a pair of spaced rivets 39. Pads 38 preferably are formed of a metallic compound frictional material 40, such as identified by the trademark, "Velvet Touch", manufactured by S. K. Wellman Company of Cleveland, Ohio. Pads 38 have a usual trapazoidal shape as shown in FIG. 2, and have the frictional material 40 extending above the edges of a cup-shaped member 41 in which the frictional material 40 is confined (FIG. 5).

In accordance with the invention, leg members 24–26 are formed with a preset slight degree of twist with respect to central area 23 of plate 22, as can be seen in FIGS. 3, 4 and 5. The degree of twisting is slight, preferably in the range of 0.25° to 2° with respect to the plane indicated by line X, which passes through plate 22 and is perpendicular to the axis of shafts 18 and 2. The importance of this preset degree of twist is described in further detail below.

Also in accordance with the invention, is the particular mounting of hub 29 on plate 22 to provide a cushioning effect therebetween. Hub mounting bolts 34 extend through circumferentially spaced holes 42 formed in central plate area 23. Holes 42 are aligned with enlarged holes 43 and 44 formed, alternately circumferentially about and in hub flange 32. Flange holes 43 are larger in diameter than flange holes 44, with flange holes 43 and 44 both being larger than plate holes 42 (FIGS. 7, 8 and 9).

A rigid metal bushing 45 having a cylindrical shank portion 46 and an enlarged head 47 is journaled on the shaft of each mounting bolt 34 with shank portion 46 extending into flange holes 43 and 44. A resilient bushing 48, preferably formed of urethane, and having a flanged end 49, is journaled on the cylindrical portion 46 of alternate bushings 45 which are inserted within large flange holes 43 (FIGS. 8 and 9). Nuts 50 are threadably engaged with the projecting threaded ends of bolts 34 clamping bushings 45 and plate 22 tightly to hub 28.

The particular propeller-like three legged configuration of friction plate 22 reduces considerably the weight of the heretofore used friction discs, which have a generally continuous circular disc configuration. Even though the weight reduction may be relatively small, in the range of 1¼ to 1½ lbs. for a usual 10 inch friction disc, such weight reduction is mainly in the outer extremities thereof and thus reduces the flywheel effect sufficiently to enable a fraction of a second increase to be obtained upon shifting gears.

The area of plate 22 is approximately 50% that of a disc having a continuous surface with the same radius as the length of leg members 24–26, indicated by dot-dash line 51, FIG. 2.

The use of three leg members instead of two, four, or more is important. It has been discovered that if two legs only are used, which would result in even less weight than plate construction 17, undesirable chatter and vibration results, and less efficient frictional engagement is achieved. Likewise, the use of four leg members increases the weight of plate 22, as well as producing undesirable chatter and vibration. It has been found that the equally spaced three leg member arrangement of friction plate construction 17 considerably reduces and eliminates chatter and vibration, as well as reducing the weight of the friction plate.

Known clutch disc constructions use a plurality of small cushions springs engageable with the clutch disc to prevent vibration and chatter. The need for such springs has been eliminated by the slight degree of twist on leg members 24–26.

The uppermost and lowermost ends of friction pads 38, indicated at 52 and 53 on opposite faces (FIGS. 2 and 5), which also will be the leading and trailing areas of leg members 24–26 depending upon the direction of rotation, are initially engaged by flywheel 3 and pressure plate 13 as shown in FIG. 5. This initial engagement is followed immediately by twisting of leg members 24–26 into complete and flush engagement of pads 38 with the upper and lower pressure plate 13 and flywheel 3 to lock the rotation of transmission shaft 18 with engine shaft 2.

The initial engagement of pad areas 52 and 53, due to the preset twist of the leg members to straight position with respect to central plate area 23 has been found to reduce and eliminate plate chatter and vibration without the use of cushion springs. Leg members 24–26 are formed, preferably of metal, and have sufficient inherent spring and resiliency due to the preset twist that they return from the flush engaged position to their preset twist position when the clutch pedal is actuated.

Usual clutch friction discs also are provided with springs between the hub and friction disc to provide a cushioned hub effect enabling the hub to move a slight distance, for example one-sixteenth inch, with respect to the disc to reduce chatter and absorb a portion of the initial force upon engagement between two revolving relatively broad areas. The use of such cushion springs also are eliminated in friction plate construction 17 by the particular means mounting hub 29 on friction plate 22.

The alternately located larger flange holes 43 having resilient bushings 48 mounted therein, enable plate 22 to move a slight distance independently of hub 29 by compressing resilient bushing 48, FIG. 8. The smaller flange holes 44 permit such independent movement between plate 22 and hub 29, a distance indicated by space 54 (FIG. 9), permitting resilient bushing 48 to be compressed a distance equal to space 54.

Rigid bushings 45 in alternate flange holes 44 abut the edges of hub flange 32, which form holes 44, to provide a stop for the independent motion between plate 22 and hub 29, preventing harmful crushing of resilient bushing 48. Thus, friction plate construction 17 provides a cushioned hub effect without the need of cushioning springs heretofore required.

The operation of clutch assembly 1 with improved plate construction 17 mounted thereon, is similar to that of a clutch assembly using a usual circular friction disc. Depression of the clutch pedal breaks the driving connection between friction pads 38 of plate construction 17, and flywheel 3 and pressure plate 13, making shaft 18 freewheeling with respect to driving shaft 2.

Friction plate construction 17, due to its three leg member configuration reduces the weight of the friction plate by approximately 50% of the heretofore used circular friction discs, thus reducing the flywheel effect, enabling the plate to slow sufficiently for synchronization with the transmission in a reduced time during a gear shifting operation.

Plate construction 17 reduces plate chatter and vibration without the use of springs by the slight degree of preset twist on leg members 24–26 with respect to the plate central portion, and by the unique hub mounting means. The hub mounting means uses alternate rigid and resilient bushings within enlarged hub flange holes to provide a cushioned hub with stop means, which stop means prevent the destruction of the resilient bushings and provides positive engagement between the hub and friction plate after the desired degree of relative motion therebetween has been achieved.

The spaced three legged configuration of plate 22 forms large voids between adjacent friction pads 38 permitting air flow and/or lubrication flow therebetween increasing heat transfer resulting in more efficient clutch operation and longer wear life of the clutch components.

Simplicity and efficiency are enhanced further by the structural arrangement of the components of plate assembly 17 by the elimination of separate spring components heretofore required to achieve reduction and elimination of plate chatter and vibration and to provide a cushioned hub effect.

Accordingly, the construction is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the clutch friction plate construction is constructed and used, the characteristics of the construction, and the advantageous, new and useful results obtained; the new and useful structures, devices, elements, arrangements, parts, and combinations, are set forth in the appended claims.

I claim:

1. Clutch friction plate construction for a high performance vehicle clutch assembly including a generally flat metal plate formed with a central opening; a central area of the plate circumferentially surrounding the opening; hub means mounted on the plate axially aligned with the central opening for mounting the plate on a vehicle transmission input shaft; the plate having three circumferentially spaced leg members formed integrally with the central area and extending radially outwardly from said central area; the three leg members being circumferentially equally spaced from each other; the leg members having generally flat opposite faces; friction pad means mounted on said opposite leg faces at the outer end of each leg member; said friction pad means being formed of a metallic compound material; the total of the maximum arcuate widths of the outer ends of the three leg members where the friction pad means thereon are located, being less than one-third of the total circumference of the clutch friction plate measured at said outer leg ends; and the total of the maximum arcuate widths of the friction pad means also being less than one-third of the total circumference of the clutch friction plate measured at said outer leg ends.

2. The construction defined in claim 1 in which the total of the combined areas of the plate central area and of the leg members is approximately one half of the area of a circular disc defined by a radius equal to the length of the leg members.

3. The construction defined in claim 1 in which each of the leg members has a generally rectangular shape; in which the leg faces terminate in side edges; and in which the friction pads are mounted on the leg members within said side edges.

* * * * *